Oct. 18, 1966  J. F. NORTON ETAL  3,279,497
QUICK DISCONNECT COUPLING
Filed Jan. 21, 1964
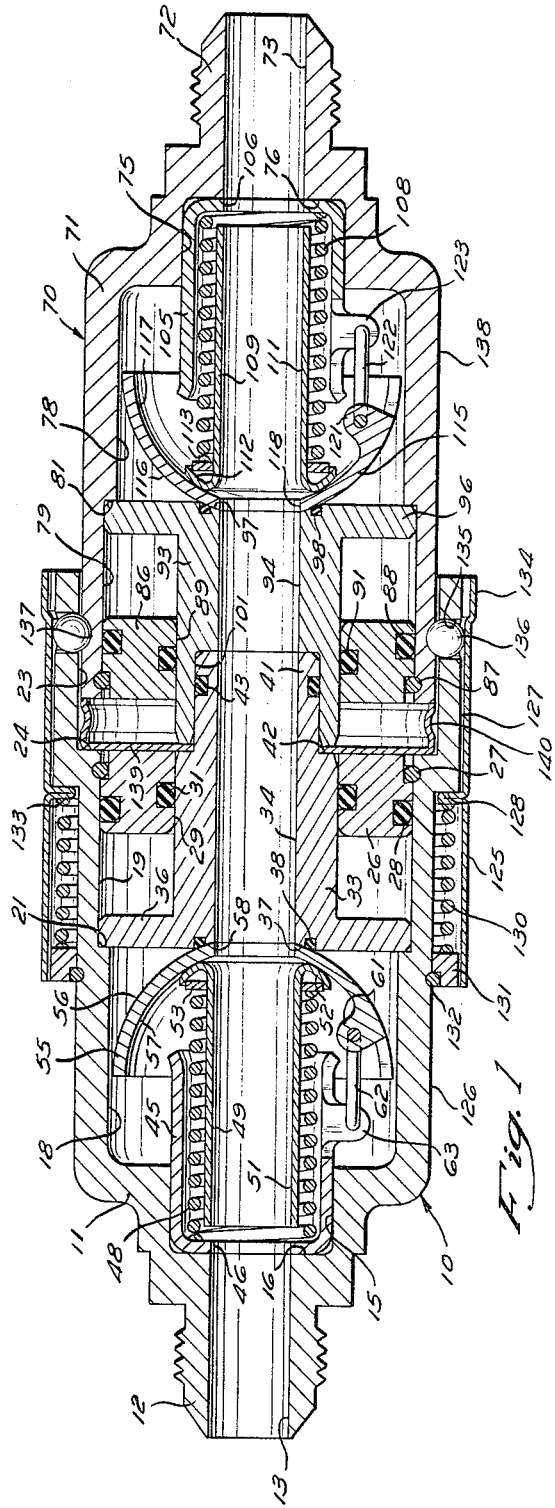
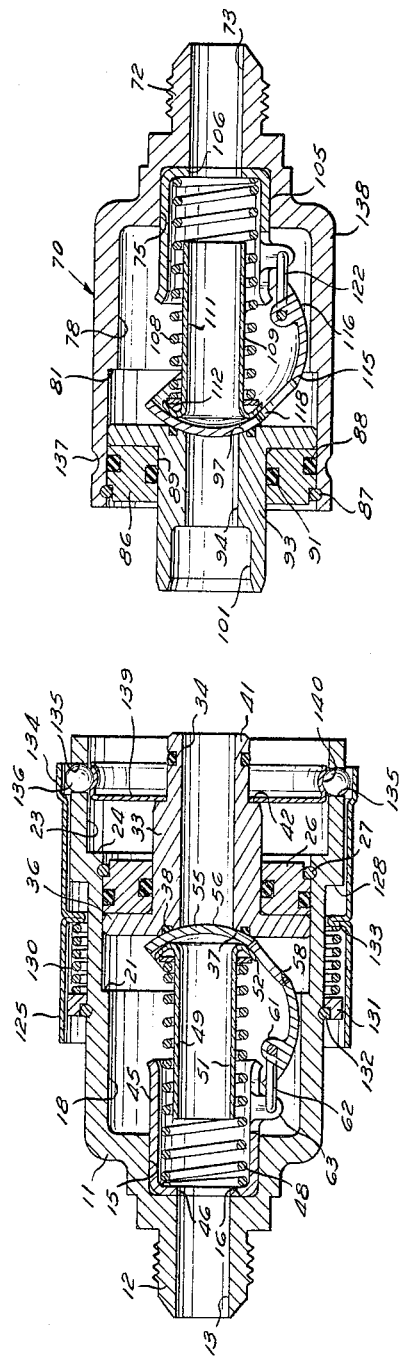
INVENTORS
JAMES FREDERICK NORTON
ROBERT SUPINGER
BY
RICHEY, McNENNY & FARRINGTON
Donald W. Farrington
ATTORNEYS United States Patent Office 3,279,497
Patented Oct. 18, 1966

3,279,497
QUICK DISCONNECT COUPLING
James Frederick Norton, Cleveland, and Robert Supinger, Mentor, Ohio, assignors to The Weatherhead Company, Cleveland, Ohio, a corporation of Ohio
Filed Jan. 21, 1964, Ser. No. 339,247
7 Claims. (Cl. 137—614.03)

This invention relates generally to fluid couplings and more particularly to valved fluid couplings of the quick disconnect type.

It is a primary object of this invention to provide a novel valved quick disconnect fluid coupling which provides the straight through flow passage characteristics of ball or plug valves without the use of apertured balls or plugs as valving members.

It is another object of this invention to provide a novel valved quick disconnect fluid coupling in which the valving members are moved between the open and closed positions by a straight line axial movement of the coupling members as they are connected and disconnected.

It is another object of this invention to provide a novel valved quick disconnect fluid coupling as set forth in the preceding objects in which the valve members are movable between the open and closed position with a minimum of friction.

It is another object of this invention to provide a novel valved quick disconnect fluid coupling as set forth in the preceding objects in which the valve members are held in the closed or sealing position with a sealing force from the pressure in the respective lines.

It is still another object of this invention to provide a novel valved quick disconnect fluid coupling as set forth in the preceding objects which is simple in construction to allow low cost of manufacture while retaining a high degree of dependability and long service life.

In brief, the foregoing objects are accomplished in the preferred embodiment of this invention by the use of thin-walled hemispherical shells which seat against a valve seat on a plunger which moves axially along the coupling when the coupling is connected or disconnected. The shells are anchored at one side by means of a swivel link which permits the shell to rotate about its center of curvature as the center of curvature moves axially in response to movement of the plunger so that the shell may rotate either to close off the valve seat or to open the valve by allowing an aperture in the shell to be shifted into alignment with the valve seat. The valve seat plungers are engagable with each other to form a closed fluid passage and as they are compressed inwardly when the coupling is connected, their inward axial movement causes the shells to rotate to bring the aperture into alignment with the valve seat when the members are completely engaged. To lock the members together ball detents are used in cooperation with a spring loaded locking sleeve so that the locking may be readily accomplished by simple axial movement of the locking sleeve.

Further features and advantages of this invention will readily become apparent to those skilled in the art upon a complete understanding of the preferred embodiment of the invention as shown in the accompanying drawings and described in the following detailed description.

In the drawings:

FIGURE 1 is a longitudinal cross-sectional view of a coupling according to the prefered embodiment of the invention showing the two coupling halves connected together;

FIGURE 2 is a longitudinal cross-sectional view of the left-hand or socket half of the coupling of FIGURE 1 with the coupling disconnected; and FIGURE 3 is a longitudinal cross-sectional view of the right-hand or nipple half of the coupling of FIGURE 1 with the coupling disconnected.

Referring now to the drawings in greater detail, the socket half 10 has a generally cup shaped body 11 terminating in a fitting 12 to receive a mating fitting for attaching the socket half to a hose. A passage 13 extends through the fitting 12 into the interior of the body 11 where it opens into a reduced bore 15 forming a shoulder 16 at the junction between passage 13 and reduced bore 15. The reduced bore 15 opens into a main bore 18 which in turn opens into an enlarged bore 19 at shoulder 21. Outwardly of the enlarged bore 19 is a counterbore 23 which joins with the enlarged bore 19 at another shoulder 24.

An annular plug 26 is fitted within the outer end of the enlarged bore 19 and retained against outward movement by a snap ring 27. Annular plug 26 carries an O-ring seal 28 on its outer periphery to make sealing engagement with the enlarged bore 19, and in addition is provided with an axial bore 29 carrying an O-ring seal 31. A slideable plunger 33 is mounted within bore 29 and in turn has an axial passage 34 having substantially the same diameter as that of passage 13. Axially inwardly of the annular plug 26, plunger 33 is provided with a radial flange 36 having an outer diameter substantially the same as that of enlarged bore 19 so that upon axial sliding movement of plunger 33, flange 36 will abut against shoulder 21 to limit movement of the plunger. A valve seat 37 is formed on the face of flange 36 adjacent the passage 34 and includes a seal member 38 which is preferably made of a low friction sealing material such as polytetrafluoroethylene or other fluorocarbon elastomer. At the other end, plunger 33 has a reduced neck 41 which extends axially outward from the shoulder 42 to be received within the outer coupling member as will be described in greater detail hereinafter. To provide proper sealing, the neck 41 is provided on its exterior with a suitable O-ring seal 43.

A cup 45 is mounted within the reduced bore 15 and positioned to abut against the shoulder 16. Cup 45 has an aperture 46 therein to permit fluid flow from the fitting passage 13 into the interior of the socket half. A helical compression spring 48 is mounted within the cup 45, and in turn, a tubular follower 49 is carried within spring 48. Follower 49 has an exial passage 51 extending therethrough with a diameter substantially equal to that of the passage 13. At its end away from the cup 45, follower 49 has a rounded end formed by a reverse flared annular lip 52 against the underside of which is fitted a washer 53 which serves as an abutment for the other end of the spring 48. Thus, spring 48 serves to bias the tubular follower 49 outward away from the cup 45 and toward the plunger 33.

A valve member 55 is arranged to be positioned between the follower 49 and plunger 33 so that by its cooperation with the valve seat 37 it may selectively seal or open the flow of fluid between the fitting passage 13 and the plunger passage 34. The valve member 55 is in form of a generally hemispherical shell of substantially unform wall thickness to have a spherical outer surface 56 arranged to make sealing engagement with the valve seat 37 and seal member 38, and to have a generally spherical inner surface 57 against which the lip 52 on follower 49 bears. To permit flow through the valve member 55, it is provided with an aperture 58 having a diameter substantially equal to that of passage 34 and plunger 33, and this aperture is offset somewhat from the center of area of the outer surface 56 to allow the shell to be rotated about its center of curvature to bring an adjacent portion into alignment with the valve seat 37 and thus prevent fluid flow through the passage 34.

The valve member 55 is provided at its one edge on its inner side with a lug 61 which pivotally receives a drag link 62, the other end of which is pivotally mounted on a projecting lug 63 on the cup 45. Since the plunger 33 is able to slide axially between the annular plug 26 and the shoulder 21, and since the valve member 55 is biased into engagement with the valve seat, inward movement of plunger 33 causes the valve member 55 and follower 49 to shift toward the cup 45. However, since the valve member 55 has one portion positioned relative to the cup 45 by the drag link 62, the valve member 55 is thus forced to rotate about its center of curvature which lies on the axis of the plunger 33 and the follower 49. Thus, the valve member 55 always remains in sealing contact with the valve seat 37 and as it rotates about its center of curvature, this center of curvature moves along the axis and accordingly the drag link 62 oscillates about the lug 63 to maintain the valve member 55 in proper alignment on the axis. Preferably, the line through the center of curvature and the pivot point of drag link 62 on lug 61 should make equal angles with the axis of the coupling in both the fully open and closed position so that in these positions the drag link is parallel to the axis.

The other half of the coupling, the nipple half 70 is constructed generally the same as the socket half 10 except for those differences necessary to allow the two halves to cooperate in sealing relationship. Thus, the nipple half 70 has a generally cup shaped body 71 provided at one end with a fitting 72 having an axial passage 73 extending therethrough. Inwardly from the fitting 72, the body 71 has a reduced bore 75 connected ot the passage 73 at a shoulder 76. At the end away from shoulder 76, reduced bore 75 opens into the main bore 78 which at its other end is connected to an enlarged bore 79 at the shoulder 81.

An annular plug 86 is fitted in the outer end of bore 79 and retained against outward movement by a snap ring retainer 87. The annular plug 86 is provided with an O-ring seal 88 to make sealing engagement with the bore 79 and has a bore 89 extending axially therethrough and also provided with an O-ring seal 91. A plunger 93 is slidably mounted within the bore 89 and is provided with axial passage 94 substantially the same diameter as that of fitting passage 73 and of the passage 34 in the socket half plunger 33. Plunger 93 is provided with a radial flange 96 away from the annular plug 86 to limit movement of the plunger 93 by engagement with either the side of the annular plug 86 or the shoulder 81. A valve seat 97 which is provided on the flange 96 adjacent the passage 94 and valve seat 97 in turn is provided with a seal member 98 preferably formed of a low friction sealing material such as polytetrafluoroethylene. At the end away from the flange 96, the plunger 93 is provided with a counterbore 101 adapted to receive the neck 41 on plunger 33 and make sealing contact with the O-ring seal 43.

A cup 105 is mounted in bore 75 and has an aperture 106 in alignment with the passage 73. A helical compression spring 108 is fitted within the cup 105 and a tubular follower 109 is in turn carried within the spring 108. The follower 109 has a passage 111 therethrough to serve as a passage between the plunger passage 94 and the fitting passage 73. At its end away from cup 105 the follower 109 has a rounded end formed by a reverse flared annular lip 112, against the underside of which abuts a washer 113 which serves as the abutment for the other end of helical spring 108 which therefore serves to bias the follower 109 away from the cup 105.

A valve member 115 in the form of a hemispherical shell is mounted within the bore 78 between the plunger 93 and follower 109. Valve member 115 has a spherical outer surface 116 making sealing contact with the valve seat 97 and seal member 98. The valve member 115 has a substantially uniform thickness and has a spherical inner surface 117 which makes bearing contact with the lip 112 on the follower 109. Valve member 115 also has an aperture 118 substantially the same diameter as that of passage 94 which moves in alignment with the valve seat 97 when the valve member is in the open position. Valve member 115 operates in the same manner as the corresponding valve member in the socket half 10, and accordingly is provided with a lug 121 to pivotally receive a drag link 122 whose other end is pivotally engaged in a lug 123 on cup 105. The valve portion of the nipple half 70 is identical with that of the socket half 10 and operates in the same manner when the coupling is connected together and disconnected to open and close the valves.

The mechanism for locking the two coupling halves together is carried on the socket half 10 and includes a tubular sleeve 125 which is mounted to have an annular clearance from the reduced outer portion 126 of body 11 and is guided by making bearing fit with an enlarged cylindrical portion 127 which joins the reduced protion 126 at the shoulder 128. The tubular sleeve 125 is biased toward the nipple half 70 by a helical spring 130 mounted around the outer portion 126. At its one end spring 130 bears against an annular abutment 131 which is held in place by a snap ring 132. At its other end spring 130 bears against an inwardly extending annular flange 133 on the tubular sleeve 125, which flange in turn is adapted to engage the shoulder 128 to limit movement of the sleeve 125 under the action of spring 130. At its other end, sleeve 125 has an enlarged annular portion 134 as will be described in greater detail hereinafter.

The outer portion of the socket half body 11 has a plurality of radial bores 135 extending therethrough between the counterbore 23 and the enlarged outer portion 127. Each of these bores 135 slidably receives a ball 136 having a diameter somewhat greater than the wall thickness of the body at this point. The balls 136 are adapted ot engage an annular detent groove 137 on the outer periphery 138 of the nipple body 71 and are retained in engagement with the groove by the sleeve 125. When the sleeve 125 is moved rearwardly so that the enlarged portion 134 overlies the balls, they may move radially outward to disengage from the groove 137 and allow the two coupling halves to be disengaged. To prevent the balls 136 from moving inward when the coupling halves are disconnected, a ball retainer 139 is mounted on the plunger 33 at the shoulder 42 to fit within the counterbore 23 and move axially with the plunger 33. The ball retainer 139 is generally cup shaped and along its outer periphery is provided with an annular groove 140 to receive the balls 136 and hold both the ball retainer 139 and the balls 136 in place when the socket half is disconnected as shown in FIGURE 2.

It will therefore be seen that when the coupling halves are disconnected as shown in FIGURES 2 and 3, the respective plungers will be in their forward positions abutting against their respective annular plugs and the valve members will be rotated in a position to block off the plunger passages and thereby prevent leakage of fluid to the atmosphere. The coupling is easily connected together by a simple axial sliding movement after the neck 41 on plunger 33 is first fitted within the counterbore 101 on plunger 93 and sealing engagement between the passages thus formed. Further movement of the coupling halves will thus cause the plungers 33 and 93 to be forced inwardly against the biasing force not only of the fluid within the coupling but of the follower springs. By selection of the biasing force of the springs 48 and 108, the plunger movement and hence the valve actuation may be made either in unison or sequentially. As the followers are depressed, the valve members are caused to rotate about their centers of curvature while moving inwardly so that when the coupling halves are fully engaged as shown in FIGURE 1 the valve members will have rotated to a position to bring their apertures into alignment with the valve seats, at which point the balls 136 will be free to engage the detents 137 and lock the coupling together.

When the coupling is fully connected as shown in FIGURE 1 the passage through both coupling halves is of substantially uniform diameter throughout its length so as to eliminate any restrictions or turbulence which might cause resistance to flow through the coupling. Because the valve members rotate about a center of curvature which lies along the central axis of the couplings and since they make sealing engagement only with the seal members with the valve seats which are selected to be of a low friction of sealing material, there is relatively little friction involved in rotating the valve members between the open and closed positions. When the coupling is disconnected the valve members easily move to the closed positions assisted not only by the biasing force exerted through the followers, but also by the internal pressure forces which act on the plungers to move the plungers outwardly against the annular plugs so that the valve members which are restrained by their respective drag links must rotate into sealing position under the action of both the spring biased followers and the fluid pressure exerted on the underside of the valve member.

Although the preferred embodiment of this invention has been shown and described in detail, it is recognized that various modifications and rearrangements may suggest themselves to those skilled in the art and may be resorted to wthout departing from the scope of the invention as defined in the claims.

What I claim is:

1. A quick disconnect coupling comprising a pair of coupling members adapted to make sealing engagement with each other along an axis, means to secure said members together in sealing relationship, each of said coupling members comprising a body, a valve seat on said coupling member, a rotatable valve member having a spherical surface making sealing engagement with said valve seat and rotatable between open and closed positions, said valve member having an opening therein aligned with said valve seat when said valve member is in the open position, and an axially slidable member on said body movable by engagement with the other coupling member to rotate said valve member into the open position, and spring means to rotate said valve member into the closed position when said coupling members are disconnected.

2. A quick disconnect coupling comprising a pair of coupling members adapted to make sealing engagement with each other along an axis, means to secure said coupling members together in sealing relationship, each of said coupling members comprising a body, said body having an interior chamber and an open end, a plunger slidably mounted in said body at the open end, said plunger having means at the outer end adapted to make sealing contact with the other coupling member, said plunger having a passage therethrough, a valve seat on said plunger at the inner end of said passage, a rotatable valve member adapted to make sealing engagement with said valve seat and movable between open and closed positions, said valve member having an opening therein adapted to move into alignment with said seat when the valve member is in the open position, link means connecting said valve member with said body, whereby inward movement of said plunger causes said valve member to rotate and shift rearwardly with said plunger to rotate said valve member into the open position, and spring means operable to bias said plunger outwardly and rotate said valve member to the closed position when said coupling members are disconnected.

3. A quick disconnect coupling comprising a pair of coupling members adapted to make sealing engagement with each other along a longitudinal axis, means to secure said coupling members together in sealing relationship, each of said coupling members comprising a body, said body having an interior chamber and an open end, a plunger slidably mounted in said body at the open end, said plunger having means at the outer end adapted to make sealing contact with the other coupling member, said plunger having a passage therethrough, a valve seat on said plunger at the inner end of said passage, a valve member adapted to make sealing engagement with said valve seat and rotatable about a transverse axis between open and closed positions, said valve member having an opening therein adapted to move into alignment with said seat when the valve member is in the open position, link means connecting said valve member with said body, whereby inward movement of said plunger causes said valve member to rotate about said transverse axis and shift rearwardly with said plunger to rotate said valve member into the open position, and spring means operable to bias said plunger outwardly and rotate said valve member to the closed position when said coupling members are disconnected.

4. A quick disconnect coupling comprising a pair of coupling members adapted to make sealing engagement with each other along a longitudinal axis, means to secure said coupling members together in sealing relationship, each of said coupling members comprising a body, said body having an interior chamber and an open end, a plunger slidably mounted in said body at the open end, seal means between said plunger and said body, stop means limiting outward movement of said plunger, said plunger having means at the outer end adapted to make sealing contact with the corresponding plunger on the other coupling member, said plunger having a passage therethrough, a valve seat on said plunger at the inner end of said passage, a valve member adapted to make sealing engagement with said valve seat and rotatable about a transverse axis between open and closed positions, said valve member having an opening therein adapted to move into alignment with said seat when the valve member is in the open position, link means connecting said valve member with said body, whereby inward movement of said plunger causes said valve member to rotate about said transverse axis and shift rearwardly with said plunger to rotate said valve member into the open position, and spring means operable to bias said plunger outwardly and rotate said valve member to the closed position when said coupling members are disconnected.

5. A quick disconnect coupling comprising a pair of coupling members adapted to make sealing engagement with each other along a longitudinal axis, means to secure said coupling members together in sealing relationship, each of said coupling members comprising a body, said body having an interior chamber and an open end, a plunger slidably mounted in said body at the open end, said plunger having means at the outer end adapted to make sealing contact with the other coupling member, said plunger having a passage therethrough, a valve seat on said plunger at the inner end of said passage, a valve member adapted to make sealing engagement with said valve seat and rotatable about a transverse axis between open and closed positions, said valve member having the form of a generally hemispherical shell having an aperture therein adapted to move into alignment with said seat when the valve member is in the open position to provide a straight through flow passage, line means connecting said shell with said body, whereby inward movement of said plunger causes said shell to rotate about said transverse axis and shift rearwardly with said plunger to rotate said shell into the open position, and spring means operable to bias said plunger outwardly and rotate said valve member to the closed position when said coupling members are disconnected.

6. A quick disconnect coupling comprising a pair of coupling members adapted to make sealing engagement with each other along a longitudinal axis, means to secure said coupling members together in sealing relationship, each of said coupling members comprising a body, said body having an interior chamber and an open end, a plunger slidably mounted in said body at the open end, said plunger having means at the outer end adapted to make sealing contact with the other coupling member, said plunger having a passage therethrough, a valve seat on said plunger at the inner end of said passage, a valve member adapted to make sealing engagement with said valve seat and rotatable about a transverse axis between open and closed positions, said valve member having the form of a generally hemispherical shell having an aperture therein adapted to move into alignment with said seat when the valve member is in the open position to provide a straight through flow passage, link means connecting said shell with said body, said link means being pivotally mounted on said body and on said shell at a point spaced from said transverse axis, whereby inward movement of said plunger causes said shell to rotate about said transverse axis and shift rearwardly with said plunger to rotate said shell into the open position, and spring means operable to bias said plunger outwardly and rotate said valve member to the closed position when said coupling members are disconnected.

7. A quick disconnect coupling comprising a pair of coupling members adapted to make sealing engagement with each other along a longitudinal axis, each of said coupling members comprising a body, a fitting at one end of said body, a first passage extending axially through said fitting, a reducer bore in said body at the inner end of said first passage, a first shoulder intermediate said first passage and said reduced bore, a main bore in said body extending from said reduced bore toward the other end of said body, a counterbore at the outer end of said main bore, a second shoulder between said main bore and said counterbore, an annular plug in said counterbore, means to retain said annular plug in said counterbore against axial outward movement away from said second shoulder, seal means between said annular plug and the wall of said counterbore, an axial bore through said annular plug, seal means carried by said axial plug on said axial bore, a plunger slidably mounted in said axial bore of said annular plug, an axial passage through said plunger having a diameter substantially equal to that of said first passage in said body, a radial flange on the inner end of said plunger, said flange having an outer diameter slightly less than that of said counterbore and greater than that of said main bore to limit axial sliding movement of said plunger between said second shoulder and said annular plug, a valve seat formed on said plunger at the inner end of said plunger bore adjacent said radial flange, a seal member of low friction sealing material carried by said valve seat, a cup mounted in said reduced bore and abutting at one end against said first shoulder, an aperture in the wall of said cup adjacent said first shoulder having a diameter substantially equal to that of said first passage in said body and in axial alignment therewith a helical spring within said cup extending axially toward said plunger, a tubular follower member mounted within said spring and extending toward said plunger, said tubular follower having an internal passage of substantially the same diameter as that of said first passage, the end of said follower away from said cup having a rounded end surface, abutment means carried on the end of said follower away from said cup to receive the other end of said helical spring, a valve member mounted between said follower and said valve seat, said valve member being in the form of a generally hemispherical shell having a wall of substantially uniform thickness and spherical inner and outer surfaces, said spherical outer surface making sealing engagement with said seal member, the center of curvature of said inner and said outer spherical surfaces lying on said longitudinal axis, said valve member having an aperture therein displaced a space distance from the center of area thereof, said aperture having a diameter substantially equal to that of said first passage and said plunger passage, a lug on said valve member spaced away from the center of area thereof in the same direction as the spacing of said aperture, said lug projecting radially inward from the inner surface of said valve member, a lug projecting radially outward from the outer surface of said cup, a drag link pivotally received in said valve member lug and in said cup lug to retain said lugs a spaced distance apart at all times, whereby cooperative movement of said follower under the biasing force of said helical spring and said plunger causes said valve member to rotate about an axis transverse to and intersecting said longitudinal axis by means of the constraint imposed by said drag link to selectively bring said aperture in alignment with said valve seat when said plunger is in an inner position adjacent said second shoulder and to shift said aperture away from said valve seat to close off said valve seat when said plunger is in an outer position with said radial flange adjacent said annular plug, the plunger member on one of said coupling members having a reduced neck projecting therefrom on the end away from said radial flange, the plunger on the other of said coupling members having a counterbore on the end of said plunger away from its flange to receive the neck of the other plunger in sealing relationship, said one coupling member having an enlarged sleeve portion the outer end thereof adapted to receive the other coupling member, an annular detent groove on the outer surface of said other coupling member underlying said sleeve, a detent sleeve mounted on the outer periphery of said one coupling member and slidably axially thereon, radially movable ball detent means carried by said enlarged sleeve portion of said one coupling member engageable with said detent groove of said other coupling member, said detent sleeve being constructed and arranged to force said ball detent means radially inward to engage said annular detent groove and hold said coupling members in locked relationship when said detent sleeves is moved axially in one direction, spring means biasing said detent sleeve in said one direction, means on said detent sleeve when said detent sleeve is moved in the other direction to allow said ball detent means to move radially outward and disengage from said annular groove to permit said coupling members to be moved apart axially whereby their respective plungers move toward their respective annular plugs to shift said valve members into the closed position, and retainer means carried on the plunger of said one coupling member movable into alignment with said ball detent means when said plunger is in the outer position to limit radially inward movement of said ball detent means.

References Cited by the Examiner

UNITED STATES PATENTS

| | | | |
|---|---|---|---|
| 187,982 | 3/1877 | Persson | 251—149.2 |
| 1,961,173 | 4/1932 | Schutte | 251—313 |
| 2,974,922 | 3/1961 | Keithahn | 251—348 |

WILLIAM F. O'DEA, *Primary Examiner.*

H. COHN, *Assistant Examiner.*